(12) United States Patent
Hiroyoshi

(10) Patent No.: US 8,001,350 B2
(45) Date of Patent: Aug. 16, 2011

(54) INFORMATION PROCESSING APPARATUS

(75) Inventor: Kei Hiroyoshi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 439 days.

(21) Appl. No.: 12/285,238

(22) Filed: Sep. 30, 2008

(65) Prior Publication Data

US 2009/0193179 A1     Jul. 30, 2009

(30) Foreign Application Priority Data

Jan. 24, 2008   (JP) ................................ 2008-013218

(51) Int. Cl.
*G06F 12/00*     (2006.01)

(52) U.S. Cl. ................................ 711/163; 711/E12.091

(58) Field of Classification Search ........................ None
See application file for complete search history.

(56) References Cited

U.S. PATENT DOCUMENTS

| | | | |
|---|---|---|---|
| 5,245,615 A | 9/1993 | Treu | |
| 6,324,352 B1 * | 11/2001 | Suzuki | ............................ 399/13 |
| 2001/0003198 A1 * | 6/2001 | Wu | ................................ 711/104 |
| 2004/0236438 A1 * | 11/2004 | Weber et al. | ....................... 700/2 |
| 2004/0260938 A1 * | 12/2004 | Weber et al. | .................. 713/200 |

FOREIGN PATENT DOCUMENTS

| | | |
|---|---|---|
| EP | 0 517 403 A2 | 12/1992 |
| JP | 05-173808 | 7/1993 |
| JP | 2001-344096 | 12/2001 |
| JP | 2004-213457 | 7/2004 |
| JP | 2006-119956 | 5/2006 |
| KR | 10-2006-0098904 | 9/2006 |

OTHER PUBLICATIONS

Korean Office Action issued Jan. 18, 2010 in corresponding Korean Patent Application 10-2008-0095553.
First Chinese Office Action issued Apr. 25, 2011 in corresponding Chinese Application No. 200810166347.8 (5 pages) (7 pages English Translation).

* cited by examiner

*Primary Examiner* — Pierre-Michel Bataille
*Assistant Examiner* — John P Fishburn
(74) *Attorney, Agent, or Firm* — Staas & Halsey LLP

(57) ABSTRACT

A main memory and a hard disk include predetermined serial numbers. A flash memory registers the main memory and hard disk together with their serial numbers. A BIOS reads the serial numbers from the main memory and hard disk. When a read-out serial number is not registered in the flash memory, the BIOS places the information processing apparatus in an unusable state.

7 Claims, 14 Drawing Sheets

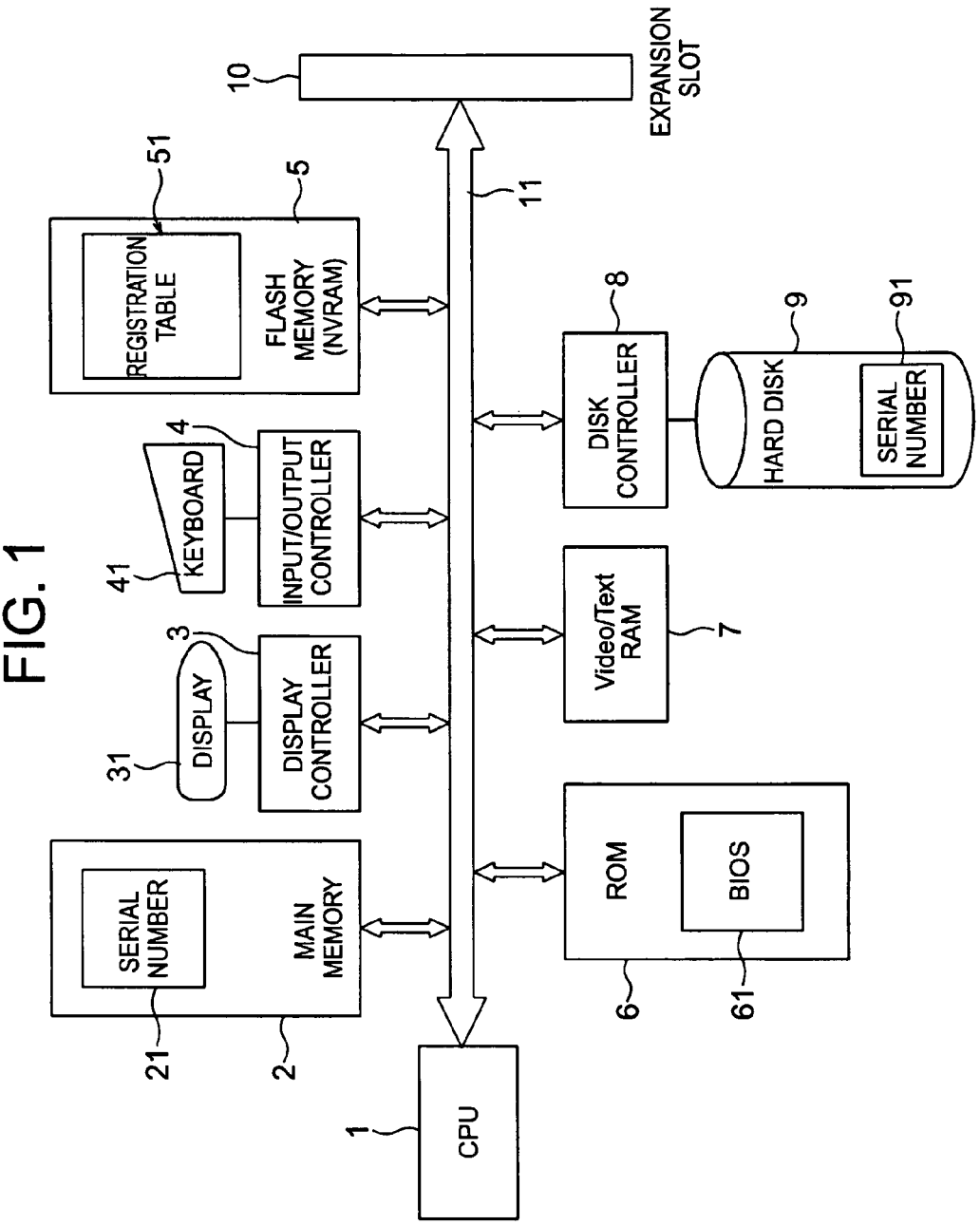

FIG. 2A
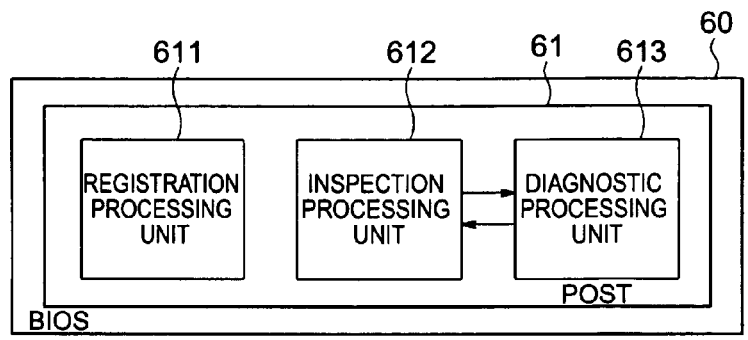
FIG. 2B
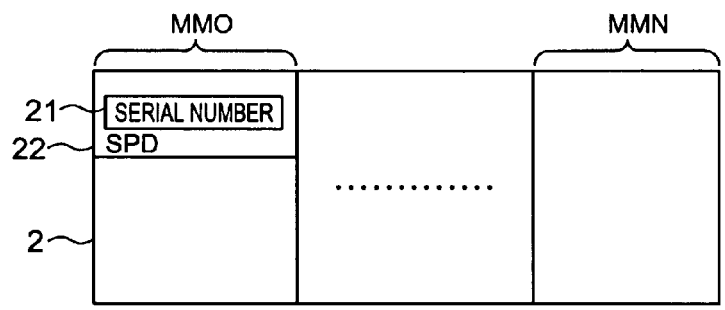
FIG. 2C
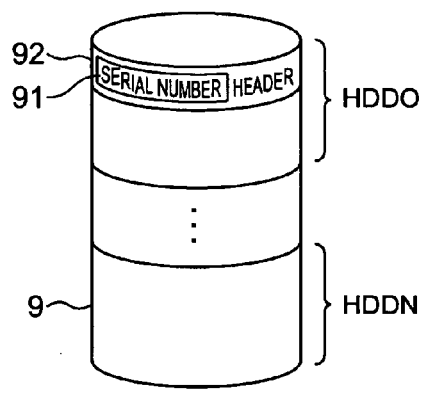
FIG. 2D
| AREA | SERIAL NUMBER | DIAGNOSIS RESULT | OPERATING FREQUENCY | FREQUENCY RANGE |
|---|---|---|---|---|
| MM0 | | | | |
| ⋮ | | | | |
| HDD0 | | | | |
| ⋮ | | | | |

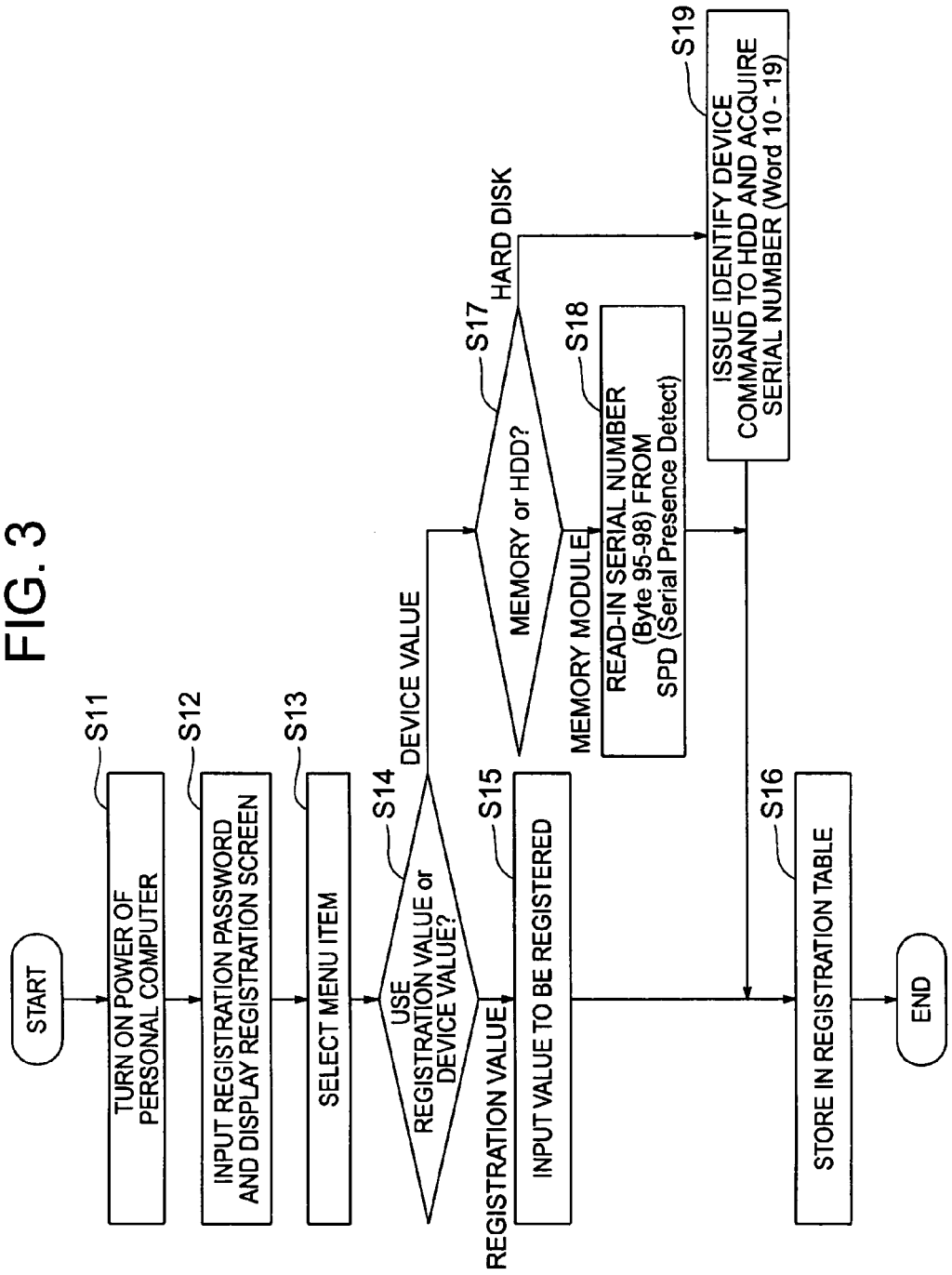

FIG. 5

```
                    BIOS SET-UP UTILITY
☐ DEVICE REGISTRATION

Registration of memory module/hard disk              Item Help

Memory slot 1:                    [Unregistered]     Registers memory modules
  Registration value:               [4E5F6941]         and hard disks to be used
  Registration of memory module:    [Enter]            with this apparatus.
                                                       If a product other than
  Memory slot 2:                    [Not mounted]      a registered product is
  Registration value:               [--------]         mounted, it will not be possible
  Registration of memory module:    [Enter]            to start the apparatus.
                                                       The wildcard symbol "*" can
  Hard disk 1:                      [Registered]       also be used in a registration
  Registration value:               [87ABCDEF8984]     value.
  Registration of hard disk:        [Enter]

Stop start-up when non-supported product is mounted          : [Use]
  Automatic diagnosis when non-supported memory product is mounted : [Do not use]
```

FIG. 8

```
System BIOS Version 1.00

CPU = System Processor x.xx GHz Detected

Warning: Unsupported memory is mounted.  System will be stopped.
```

FIG. 9

```
System BIOS Version 1.00

CPU = System Processor x.xx GHz Detected

Warning: Unsupported memory is mounted. System will be stopped.
After power is turned off, mount supported memory product and restart.
Alternatively, register memory module to be used on BIOS set-up
"device registration" screen, or set "Stop start-up
when non-supported product is mounted" to "Do not use".

<F12> key: start-up menu / <F2> key: BIOS set-up
```

FIG. 10

```
System BIOS Version 1.00

CPU = System Processor x.xx GHz Detected

Warning: Unsupported memory is mounted.
Automatic diagnosis will be continued, however operation is not guaranteed.

xxxM system memory test completed.
xxxK memory cache test completed.
Hard disk 0:

<F12> key: start-up menu / <F2> key: BIOS set-up
```

FIG. 11

```
System BIOS Version 1.00

CPU = System Processor x.xx GHz Detected

Warning: Unsupported memory is mounted.
Do you want to execute diagnosis of the memory module and test whether
or not the memory operates?
If "Yes" is selected, the apparatus will be restarted.
<y/Y> Yes/<n/N> No Diagnosing memory module ···
```

FIG. 12

```
System BIOS Version 1.00

CPU = System Processor x.xx GHz Detected

Warning: Unsupported memory is mounted.
Do you want to execute diagnosis of the memory module and test whether
or not the memory operates?
If "Yes" is selected, the apparatus will be restarted.
<y/Y> Yes/<n/N> No Diagnosing memory module ··· finished.
Diagnosis result: No particular problems.  Do you really want to use this memory?
<y/Y> Yes/<n/N> No
```

FIG. 13

```
System BIOS Version 1.00

CPU = System Processor x.xx GHz Detected

Warning: Unsupported memory is mounted.
Do you want to execute diagnosis of the memory module and test whether
or not the memory operates?
If "Yes" is selected, the apparatus will be restarted.
<y/Y> Yes/<n/N> No Diagnosing memory module ··· finished.
Diagnosis result: There is a problem. Do you really want to use this memory?
<y/Y> Yes/<n/N> No Operating frequency will be lowered to the minimum
and diagnosis performed once more.

Diagnosing memory module ···
```

FIG. 14

```
System BIOS Version 1.00

CPU = System Processor x.xx GHz Detected

Warning: Unsupported memory is mounted.
Do you want to execute diagnosis of the memory module and test whether
or not the memory operates?
If "Yes" is selected, the apparatus will be restarted.
<y/Y> Yes/<n/N> No Diagnosing memory module ··· finished.
Diagnosis result: No particular problems. Do you really want to use this memory?
<y/Y> Yes/<n/N> No
```

INFORMATION PROCESSING APPARATUS

CROSS-REFERENCE TO RELATED APPLICATIONS

This application claims the conventional priority based on Japanese Patent Application No. 2008-013218, filed on Jan. 24, 2008, the disclosures of which are incorporated herein by reference.

BACKGROUND OF THE INVENTION

1. Field of the Invention

One embodiment of the present invention relates to an information processing apparatus, which may include an information processing apparatus in which only a predetermined storage device, for example, a memory module and a hard disk can be used.

2. Description of the Related Art

An information processing apparatus such as a personal computer is extremely versatile, and various peripheral devices can be mounted thereon. A peripheral device which is important for using a personal computer is a storage device which is used to store data and the like. Examples of a storage device include a memory module (semiconductor storage device) and a hard disk.

A technology has been proposed which performs a self-inspection using serial numbers with respect to components which constitute a computer of a client (Patent Document 1; Japanese Patent Laid-Open No. 2004-213457). Another technology has also been proposed which disables activation of a software which is installed without authorization in an information processing apparatus (Patent Document 2; Japanese Patent Laid-Open No. 2001-344096). Further, a diagnostic system technology has also been proposed which uses a basic input output system in a personal computer (Patent Document 3; Japanese Patent Laid-Open No. 5-173808).

There are various standards and specifications (hereunder, referred to as "specifications") for the memory module. Main specifications for the memory module include storage capacity of an entire of the module, a density of a memory device, and a transfer rate. Similarly, there are various specifications for the hard disk. Main specifications for the hard disk include the connection interface, and storage capacity of an entire of the hard disk. These specifications differ according to the manufacturer.

Since the specifications differ described above, even when a memory module can be mounted in an expansion slot, there is a possibility that a computer can not recognize the entire memory capacity. Further, even when the memory module can be mounted in the expansion slot, there is a combination of a personal computer and memory module in which operations of them become unstable. The same applies for the hard disk.

Accordingly, it is desirable for a manufacturer and administrating person of a personal computer that only a hard disk and a memory module, which operate properly on the personal computer, can be used in the personal computer, or that only components (supported products), which correspond to the personal computer, can be used in the personal computer. Further, it is also desirable for the manufacturer and the like that a memory module and a hard disk, for which its entire memory capacity is not recognized, can not be used in the personal computer, or that only components (non-supported products), which does not correspond to the personal computer, can not be used in the personal computer. However, in contrast, there are some cases in which an user of the personal computer wants to use the non-supported products on their own responsibility.

SUMMARY OF THE INVENTION

One aspect of an object of the present invention is to provide an information processing apparatus which is not activated when a storage device other than a predetermined storage device is detected.

This information processing apparatus includes a storage device, a nonvolatile storage device, and an inspecting unit. The storage device includes predetermined identification information. The nonvolatile storage device registers the storage device together with the identification information thereof. The inspecting unit reads out the identification information from the storage device, and places, when the identification information which is read out is not registered in the nonvolatile storage device, the information processing apparatus in an unusable state.

The information processing apparatus according to one embodiment of the present invention further includes a registering unit registering the storage device together with the identification information in the nonvolatile storage device.

The information processing apparatus according to one embodiment of the present invention has the inspecting unit which outputs, when the identification information which is read out is not registered in the nonvolatile storage device, an error message, and accepts an instruction input indicating whether or not to place the information processing apparatus in an unusable state.

The information processing apparatus according to one embodiment of the present invention further includes a diagnostic unit which diagnoses the storage device when the inspecting unit is activated. When the identification information which is read out is not registered in the nonvolatile storage device, the inspecting unit activates the diagnostic unit.

The information processing apparatus according to one embodiment of the present invention has a diagnostic unit which performs, when the identification information which is read out is not registered in the nonvolatile storage device, a diagnosis on the memory module in a state that an operating frequency of the memory module is set at a lowest operating frequency.

According to the information processing apparatus, the identification information which is read from the storage device is compared with the identification information which is registered in a nonvolatile storage device in advance. And, when the identification information which is read is not registered, the information processing apparatus is placed in an unusable state. For example, the identification information of the storage device is registered in advance which operates properly in the information processing apparatus (computer), or which corresponds (is supported) to the information processing apparatus. As a result, when a storage device, which may not operate properly in the information processing apparatus or which does not correspond (is not supported) by the information processing apparatus, is mounted in an expansion slot, it is possible to place the information processing apparatus in the unusable state. In this case, when the storage device (memory module or hard disk) is mounted in the expansion slot, it is possible to prevent a situation in which the information processing apparatus cannot recognize the entire memory capacity thereof, and a situation in which the operation of the information processing apparatus is made unstable by mounting the storage device. Further, the manufacturer of the information processing apparatus and the like can ensure that only the storage device supported by the information processing apparatus can be used.

According to one embodiment of the information processing apparatus, the registering unit is provided which registers the storage device together with the identification information in the nonvolatile storage device. For example, even when a storage device is not supported by the information processing apparatus, an user can intentionally register the identification information of the storage device in advance. It is thereby possible to mount a storage device which is not supported by the information processing apparatus in an expansion slot, and use the storage device. More specifically, the user of the information processing apparatus can use the storage device which is not supported by the information processing apparatus on their own responsibility.

According to one embodiment of the information processing apparatus, when the identification information which is read out is not registered in the nonvolatile storage device, the instruction input can be accepted which indicates whether or not to place the information processing apparatus in an unusable state, after outputting an error message. Thus, even when the information processing apparatus should be placed in an unusable state, the information processing apparatus can still be used according to an instruction which is inputted by the user. Accordingly, the user of the information processing apparatus can use the storage device which is not supported by the information processing apparatus on their own responsibility.

According to one embodiment of the information processing apparatus, when the identification information which is read out is not registered in the nonvolatile storage device, the diagnostic unit is activated. Thus, when a storage device which is not supported by the information processing apparatus is connected thereto, it is possible to perform a diagnosis on the storage device before placing the information processing apparatus in an unusable state, and to use the information processing apparatus when the diagnosis result is normal.

According to one embodiment of the information processing apparatus, when the identification information which is read out is not registered in the nonvolatile storage device, the memory module is diagnosed in a state that the operating frequency of the memory module is set to the lowest operating frequency. Thus, when the storage device which is not supported by the information processing apparatus is connected thereto, it is possible to perform a diagnosis on the storage device before placing the information processing apparatus in an unusable state under the most lenient operating conditions, or under conditions in which there is the highest possibility that the storage device will operate properly. And, it is possible to use the information processing apparatus, when the diagnosis result is normal.

BRIEF DESCRIPTION OF THE DRAWINGS

FIG. 1 is a structure diagram that illustrates an example of a personal computer according to the present invention.

FIGS. 2A to 2D are explanatory drawings of the personal computer according to the present invention.

FIG. 3 is a flowchart of a registration processing in the personal computer according to the present invention.

FIGS. 4 and 5 are views that illustrate examples of a registration processing screen.

FIGS. 8 to 14 are views that illustrate examples of a verification processing screen.

DETAILED DESCRIPTION OF THE PREFERRED EMBODIMENTS

Figure 4:
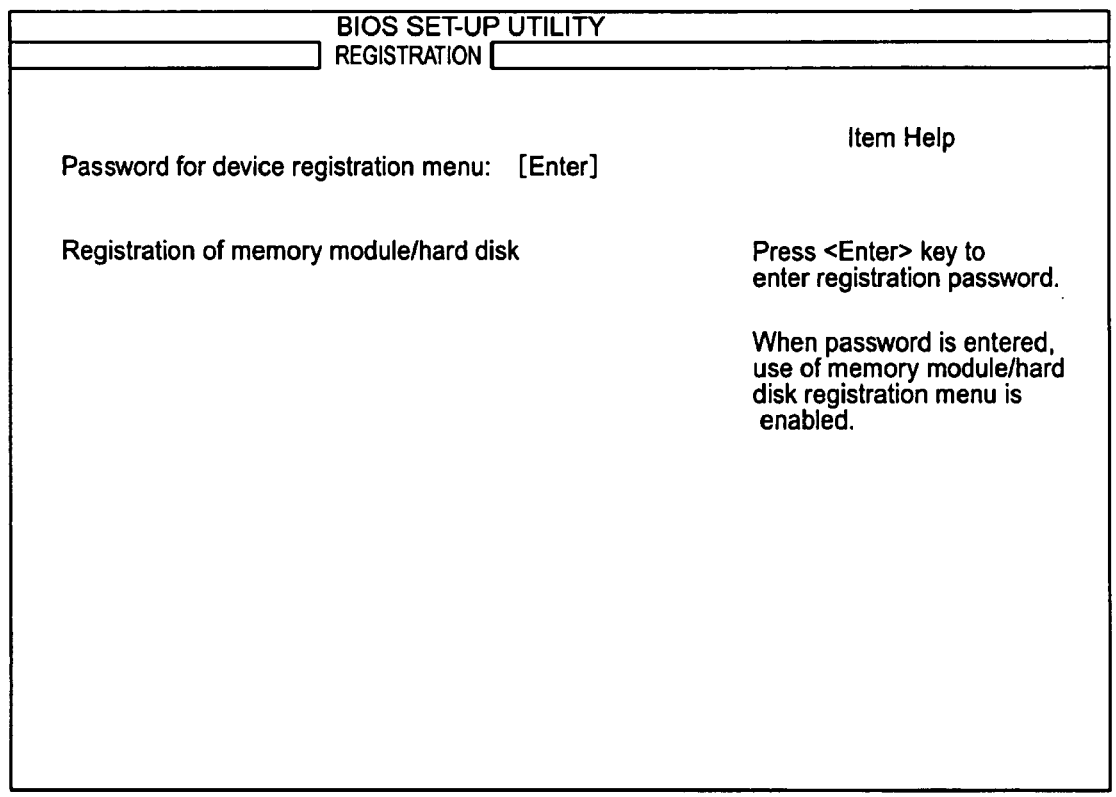

FIG. 1 is a structure diagram that illustrates an example of a personal computer as an information processing apparatus according to an embodiment of the present invention. FIG. 2 is an explanatory drawing of the personal computer according to an embodiment of the present invention.

A personal computer includes a CPU 1, a main memory 2, a display controller 3, an input/output controller 4, a flash memory 5, a ROM (read only memory) 6, a video RAM (video/text RAM) 7, and a disk controller 8. These components are connected by a bus (internal bus) 11. An expansion slot 10 is connected to the bus 11.

The personal computer includes a display 31, a keyboard 41, and a hard disk 9 as input/output devices. The display 31 is connected to a display controller 3, and is controlled thereby. The display 31 displays an error message (described later) according to an instruction of a BIOS 60 through the display controller 3. The keyboard 41 is connected to the input/output controller 4, and is controlled thereby. The keyboard 41 inputs an instruction input (described later) which is entered by a user to the BIOS 60 through the input/output controller 4. The hard disk 9 is connected to the disk controller 8, and is controlled thereby. The hard disk 9 writes or reads data (or programs) according to an instruction of the BIOS 60 or the CPU 1 through the disk controller 8.

The ROM 6 includes the BIOS (Basic Input/Output System) 60. When the power supply (not illustrated) of the personal computer is turned on, the BIOS 60 is activated in response thereto, and executes predetermined processing. As illustrated in FIG. 2A, the BIOS 60 includes a POST (Power on Self Test) 61.

The POST 61 is a self-diagnostic processing unit which performs a self-test on the personal computer after the power supply of the personal computer is turned on. When a predetermined instruction input is inputted at the time the BIOS 60 is activated by turning on the power supply, the POST 61 executes the self-test prior to activation of the BIOS 60. At that time, only the POST 61 is executed and activated, without activating the entire BIOS 60. The POST 61 includes a registration processing unit 611, an inspection processing unit 612, and a diagnostic processing unit 613. These are described later.

The main memory 2 and the hard disk 9 are storage devices which are objects of the self-test by the POST 61 (hereafter, referred to as "storage device which is a diagnosis object" and the like). The main memory 2 and hard disk 9 which are diagnosis objects are storage devices which has a possibility of storing a program. The main memory 2 is a volatile storage device including a plurality of semiconductor storage devices such as a DRAM (Dynamic Random Access Memory).

The main memory 2 and hard disk 9 which are diagnosis objects can be connected to the expansion slot 10. The hard disk 9 is connected to the expansion slot 10 through the disk controller 8, similarly to the connection to the bus 11. Thus, in addition to the main memory 2 and hard disk 9 which are provided with the personal computer in advance, for example, a user can add a main memory 2 and hard disk 9.

In contrast, the video RAM 7 is a storage device which is not a diagnosis object. This is because the video RAM 7 stores only image data and text data, and is a storage device which does not store a program. In addition, the video RAM 7 may be made a storage device which is a diagnosis object.

As illustrated in FIG. 2B, the main memory 2 includes a plurality of memory areas (memory modules) MM0 to MMN. For example, the plurality of memory modules MM0 to MMN include a plurality of (4, 8, 16 . . . ) volatile semiconductor storage devices (DRAM) which are physically independent, respectively. The plurality of memory modules MM0 to MMN include an SPD (Serial Presence Detect) 22, respectively. The SPD 22 is a parameter for initializing the memory module. A serial number 21 is stored at a predetermined position in the SPD 22. The serial number 21 is predetermined, and is a unique (or uniquely decided) identification information of the memory module (or semiconductor device).

The SPD 22 is stored in a single nonvolatile semiconductor storage device, for example. Accordingly, the memory module or main memory 2 basically includes a volatile storage device, but includes a nonvolatile storage device as apart of it. For example, a small-capacity EEPROM (Electrically Erasable and Programmable Read Only Memory) is used as the nonvolatile semiconductor storage device. As described later, the SPD 22 is read out by a predetermined (first) read command from the inspection processing unit 612.

As illustrated in FIG. 2C, the hard disk 9 includes a plurality of memory areas (hard disk areas) HDD0 to HDDN. For example, the plurality of hard disk areas HDD0 to HDDN include physically independent hard disk devices, respectively. In addition, the plurality of hard disk areas HDD0 to HDDN may include a plurality of hard disk devices, respectively. The plurality of hard disk areas HDD0 to HDDN has a predetermined storage area, for example, a header 92, at the start thereof. A serial number 91 is stored in a predetermined position of the header 92. The serial number 91 is predetermined, and is an unique identification information of the hard disk. As described later, the serial number 91 is read out by a predetermined (second) read command from the inspection processing unit 612.

The flash memory 5 is a memory which is used by the BIOS 60, and includes a registration table 51. The flash memory 5 may also include another nonvolatile storage device such as a NVRAM. The registration table 51 is created in advance before use of the personal computer by a user. For example, the registration table 51 is created at the time of shipment from the manufacturer's factory. The registration table 51 registers storage devices, which are diagnosis objects (that is, a main memory 2 and a hard disk 9) and are connectable to the personal computer, together with serial numbers 21 and 91 and the like thereof.

As illustrated in FIG. 2D, the registration table 51 stores a serial number 21 or 91, a diagnosis result, a operating frequency which is setting, and an operable frequency range for each of the plurality of memory modules MM0 to MMN and hard disk areas HDD0 to HDDN (or a plurality of memory areas). When performing registration to the registration table 51 of the memory area, the memory area (name), the serial number 21 or 91, the operating frequency which is setting, and the operable frequency range are registered simultaneously. The diagnosis result is registered when the diagnosis is performed by the diagnostic processing unit 613.

The main memory 2 and hard disk 9 which are mounted at the time of shipment of the product are registered in the registration table 51. These are authorized components (supported products). A main memory 2 and hard disk 9, which are mounted by the user after shipment of the product, are also registered in the registration table 51. The additional mounting is performed by connection to the expansion slot 10. The additionally mounted components are authorized components or components which are not authorized (non-supported products) but which the user uses on their own responsibility (generic products). Accordingly, the main memories 2 and hard disks 9 which are registered in the registration table 51 are diagnosis targets, and also storage devices which the user wants to mounts and use.

An instruction for execution of the POST 61 is inputted from the keyboard 41 (and the input/output controller 4, the same applies hereunder) during activation of the BIOS 60 by turning on the power. Then, the POST 61 is activated and executed in response thereto. At this time, when the input instruction is one instructing which the registration processing unit 611 is to be activated, the registration processing unit 611 of the POST 61 is activated. The activated registration processing unit 611 registers storage devices which are diagnosis objects (or main memories 2 and hard disks 9) together with their serial numbers in the registration table 51 of the flash memory 5.

Accordingly, the main memory 2 and hard disk 9 (plurality of memory areas), which are already mounted at the time of shipment of the product, are registered in the registration table 51 by the manufacturer and by the registration processing unit 611 of the POST 61. Further, the main memory 2 and hard disk 9, which are additionally mounted after shipment of the product, are registered in the registration table 51 by the user and by the registration processing unit 611.

The registration processing unit 611 displays a registration screen on the display 31 (through the display controller 3, the same applies hereunder) to register the main memory 2 and hard disk 9. The user views the screen, and inputs a serial number and the like onto the registration screen from the keyboard 41. In response thereto, the registration processing unit 611 registers the desired main memory 2 and hard disk 9 together with the serial numbers of those components in the registration table 51.

As described above, when an instruction for execution of the POST 61 is inputted during activation of the BIOS 60 by turning on the power, the POST 61 is activated and executed in response thereto. At this time, when the input instruction is one instructing which the inspection processing unit 612 be activated, the inspection processing unit 612 of the POST 61 is activated. The activated inspection processing unit 612 executes an inspection of the storage devices which are connected to the personal computer. More specifically, the inspection processing unit 612 inspects all the main memories 2 and hard disks 9. At this time, the inspection processing unit 612 uses the registration table 51 of the flash memory 5. The inspection processing unit 612 calls the diagnostic processing unit 613 based on the inspection result when it is necessary. The diagnostic processing unit 613 which is called executes a diagnosis of all the main memories 2 and hard disks 9 which are connected to the personal computer.

The inspection processing unit 612 reads out serial numbers from the main memories 2 and hard disks 9, respectively, according to a predetermined first and second read command. As described above, the reading is performed during execution of the POST 61 of the personal computer. The inspection processing unit 612 compares the serial numbers which are read out (device serial numbers) with serial numbers which are registered in the registration table 51 (registered serial numbers). This comparison is performed for all main memories 2 and hard disks 9 which are connected to the personal computer. When it is found based on the comparison result that a device serial number is not registered in the registration table 51, the inspection processing unit 612 places the personal computer in an unusable state.

First, when the device serial number matches the registered serial number, that is, when the device serial number is registered in the registration table 51, the main memory 2 and hard disk 9 is an authorized component, or is a component which the user wishes to use (or, is a supported product). In this case, the inspection processing unit 612 returns the control to the BIOS 60. As a result, the BIOS 60 is executed, and the personal computer is activated. At this time, the diagnostic processing unit 613 is not called from the inspection processing unit 612. This is a normal (or ordinary) activation.

In contrast, when a device serial number does not match the registered serial numbers, that is, the device serial number is not registered in the registration table 51, the main memory 2 or hard disk 9 is not an authorized component, or is a component which the user does not wish to use (or, is a non-supported product). In this case, the inspection processing unit 612 outputs (displays) an error message on the display 31, and basically does not activate the personal computer (or does not activate the BIOS 60).

In practice, the inspection processing unit 612 includes a plurality of units which enable the user to select whether or not to stop the activation of the personal computer after (or at the same time of) displaying of the error message.

More specifically, when a device serial number is not registered in the registration table 51, the inspection processing unit 612 accepts an instruction input from the keyboard 41 which indicates whether or not to place the main memory 2 or hard disk 9 in an unusable state. To achieve this, the inspection processing unit 612 displays an acceptance screen on the display 31 to accept the input instruction. The user views this screen, and inputs the instruction on the acceptance screen from the keyboard 41. In response thereto, the inspection processing unit 612 determines whether or not to place the main memory 2 or hard disk 9 in an unusable state.

Further, when the device serial number is not registered in the registration table 51, the inspection processing unit 612 activates the diagnostic processing unit 613. When the diagnostic processing unit 613 is activated from the inspection processing unit 612, the diagnostic processing unit 613 diagnoses the main memory 2. In addition, an instruction input may be accepted which indicates whether or not to execute the diagnosis by the user.

Furthermore, when the device serial number is not registered in the registration table 51, the inspection processing unit 612 causes the diagnostic processing unit 613 to diagnose the main memory 2 in a state that an operating frequency of the main memory 2 is the lowest operating frequency. An instruction input may be accepted which indicates whether or not to execute the diagnosis at the lowest operating frequency by the user.

After the above described diagnosis by the diagnostic processing unit 613, the inspection processing unit 612 outputs (displays) the result of diagnosis by the diagnostic processing unit 613 on the display 31, and thereafter accepts an instruction input indicating whether or not to use the main memory 2 having a device serial number which is not registered in the registration table 51. To achieve this, the inspection processing unit 612 displays an acceptance screen on the display 31 to accept the instruction input. Upon viewing this, the user inputs the instruction to the acceptance screen from the keyboard 41. In response thereto, the inspection processing unit 612 determines whether or not to place the main memory 2 or hard disk 9 in an unusable state.

FIG. 3 is a flowchart of a registration processing in the personal computer according to an embodiment of the present invention. FIGS. 4 and 5 are views that illustrate an example of a screen (registration processing screen) during the registration processing.

When a power of the personal computer is turned on (step S11), the BIOS 60 is activated in response thereto. By pressing a predetermined key in this state, as is known, a BIOS setup menu is displayed. When a registration password input screen is selected on the menu, in response thereto, the BIOS 60 displays the screen on the display 31, as illustrated in FIG. 4, by instructing the display controller 3. When a registration password is inputted to the registration password input screen, the registration processing unit 611 of the BIOS 60 is activated in response thereto.

A standard setting value (default value) is used as the registration password at the time of shipment of the personal computer. Using the standard setting value, the main memory 2 and hard disk 9 which are connected to the personal computer at the time of shipment are registered in the registration table 51. The standard setting value is described in a User's Manual. The registration password can be changed as required. For example, by changing the registration password, an administrating person of the personal computer can prohibit the user of the terminal from registering a memory module or hard disk, as the user pleases.

At the activated BIOS 60, the registration processing unit 611 displays a device registration screen on the display 31 as illustrated in FIG. 5 (step S12). When a menu item (more specifically, "registration value" or "device value") is selected by the user from this registration screen (step S13), in response thereto, the inspection processing unit 612 checks whether to use the registration value or to use the device value (step S14).

FIG. 5 shows a state that "registration value" is selected. In FIG. 5, a menu item "device value" or a state that this menu item is selected in not illustrated. The "registration value" indicates a serial number which is to be inputted from the keyboard 41. When "registration value" is selected, an inputted serial number is used as a value which is registered in the registration table 51. Thus, the user can connect a desired non-supported product (generic product) to the personal computer. The "device value" indicates a serial number (unique serial number) of the main memory 2 or hard disk 9. When the "device value" is selected, the unique serial number is used as a value which is registered in the registration table 51. It is thereby possible to prevent the user from adding or exchanging the main memory 2 or hard disk 9, as the user pleases.

In FIG. 5, when the serial number of a supported product is registered in the registration table 51, the status is "registered". When a non-supported product is mounted, the status is "unregistered". When nothing is mounted, the status is "not mounted".

When specifying the registration value, a wild card can also be used. For example, when the registration value is set as "E000", main memories 2** having serial numbers "E00000 to E000FF" can be used.

In a case that the registration value is used at the step S14, when the value to be registered is entered "4E5F6941" as illustrated into the "registration value" field (step S15), in response thereto, the registration processing unit 611 stores the value as a serial number of "memory slot 1" in the corresponding column of the registration table 51 of the flash memory 5 (step S16). The memory slot is a memory module which is connected to the expansion slot 10, for example. Further, at the steps S15 and S16, in addition to a serial number, an operating frequency and a frequency range are inputted and registered.

When using the device value at the step S14, the registration processing unit 611 checks whether the storage device is a main memory (memory module) 2 or hard disk 9 (step S17). When the storage device is the main memory 2, the registration processing unit 611 reads out a serial number 21 from byte 95 to 98 of the SPD 22 (step S18), and executes the step S16.

When the storage device is the hard disk 9, the registration processing unit 611 issues an "IDENTIFY DEVICE" command to the hard disk 9, acquires a serial number 91 from words 10 to 19 of the header 92 (step S19), and executes the step S16. The command is an ATA/ATAPI standard command.

As described above, the values are set in the registration table 51. As a result, for example, it is possible for the user to use only the storage device of a specified lot number. Further, for example, the user can mount the storage device (non-supported product) which is not supported by the personal computer (manufacturer does not guarantee operation) on the user's own responsibility. Further, after shipping the product, it is possible to detect that the storage device which is the non-supported product is mounted to the personal computer.

Figure 6:
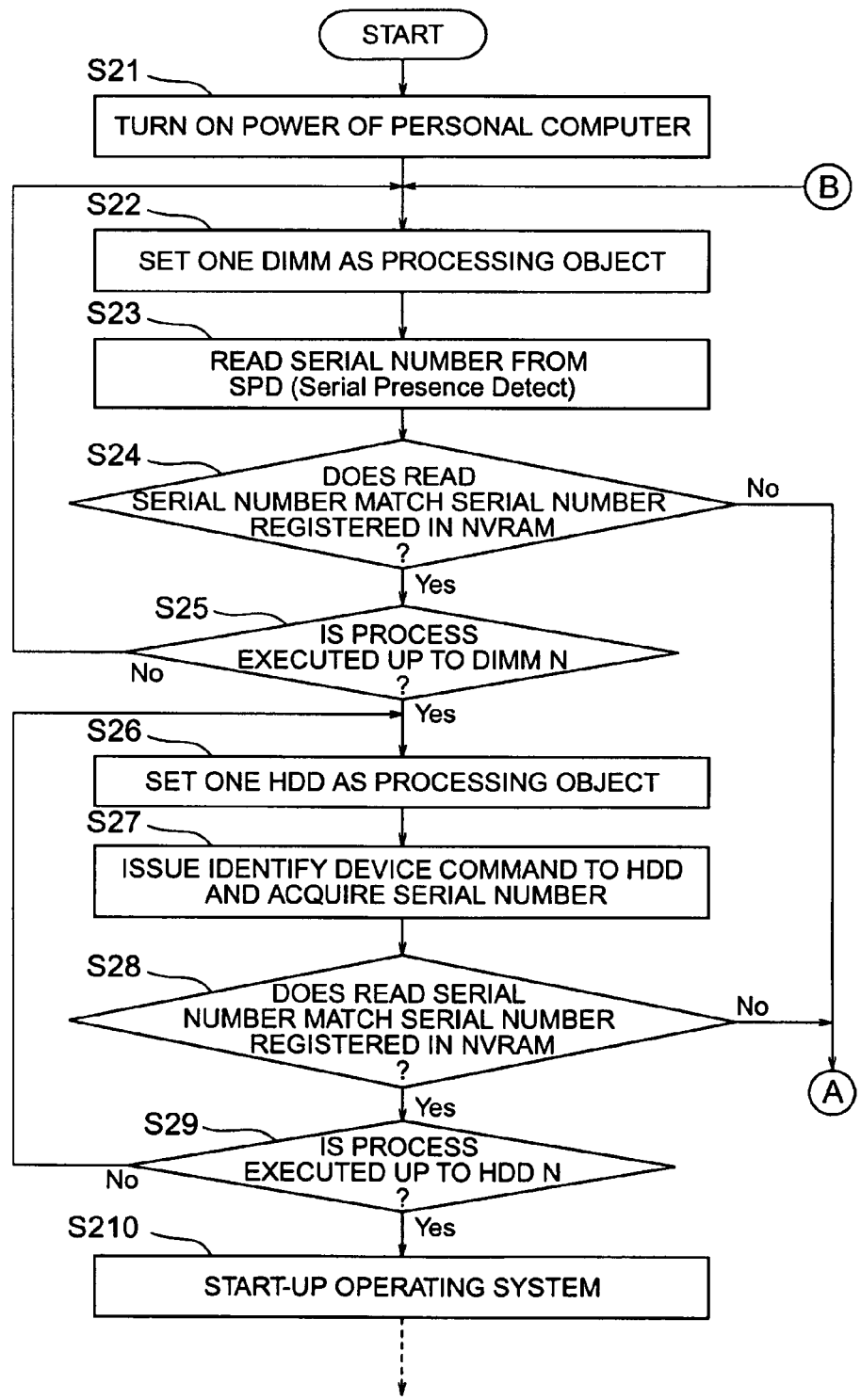
FIGS. 6 and 7 are flowcharts that illustrate a verification processing in the personal computer according to the present invention.
Figure 7:
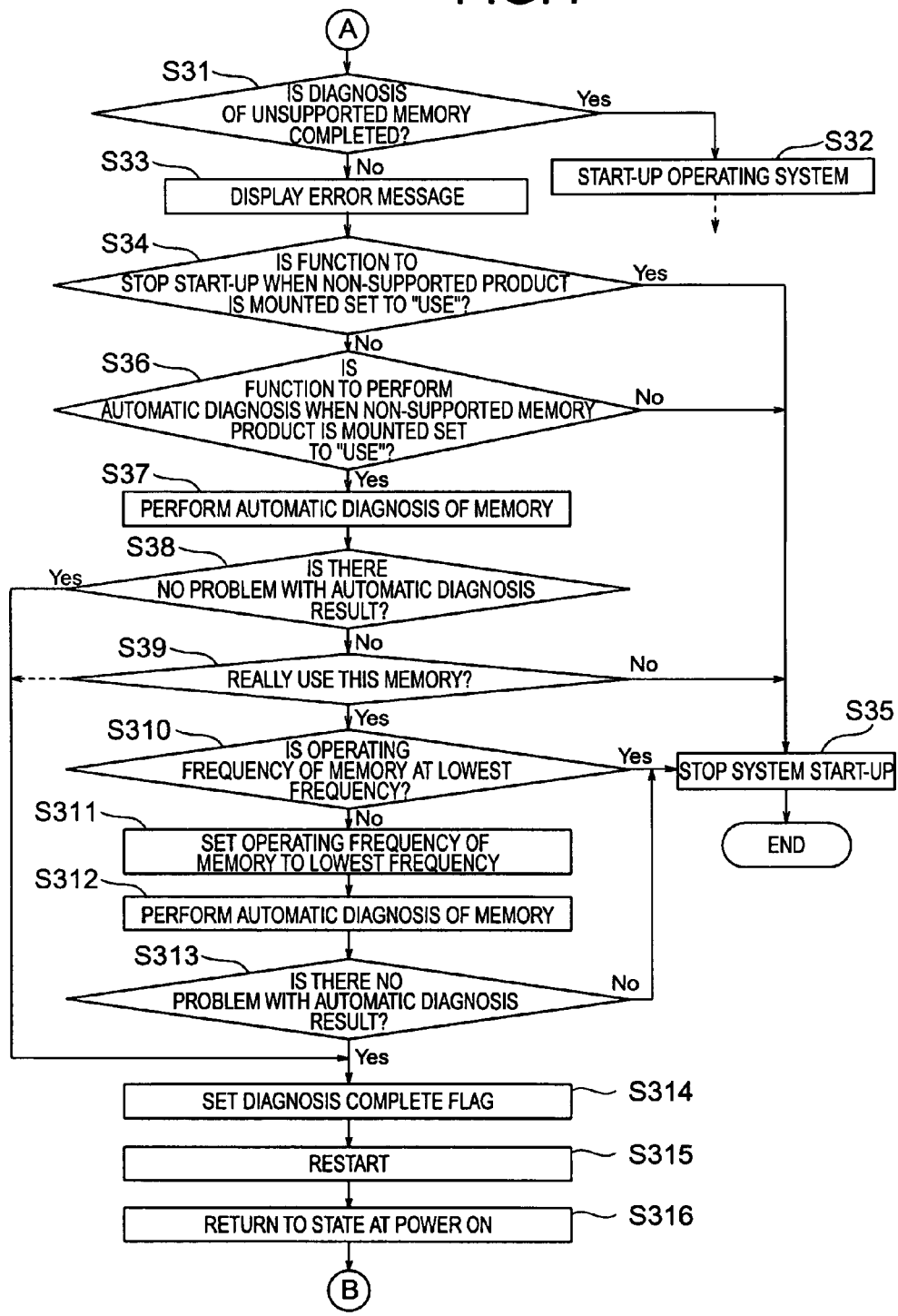

FIG. 6 and FIG. 7 are flowcharts of a verification processing in the personal computer of an embodiment of the present invention. FIGS. 8 to 14 illustrate an example of screens (verification processing screens) in the verification processing.

In FIG. 6, when the power of the personal computer is turned on (step S21), in response thereto, the BIOS 60 is activated. In the activated BIOS 60, the inspection processing unit 612 first executes a memory inspection. More specifically, the inspection processing unit 612 sets a single memory module DIMM # i (variable i=1 to N) as an object of the verification processing (step S22), reads out a serial number 21 from the SPD 22 of the DIMM of the main memory 2 (step S23), compares the read-out serial number (device serial number) 21 with a serial number (registered serial number) for the DIMM, and checks whether or not the two serial numbers match (step S24). To perform this comparison, the inspection processing unit 612 refers to the registration table 51 of the flash memory 5, and reads out the DIMM serial number which is registered.

When the two serial numbers do not match, the inspection processing unit 612 calls the diagnostic processing unit 613, and requests the diagnostic processing unit 613 to execute memory diagnostic processing. The diagnostic processing unit 613 repeatedly executes the processing of the step S31 and the subsequent steps illustrated in FIG. 7 (described later). As a result, with respect to all memory modules DIMM 0 to N which are mounted, when any of the serial numbers does not match with the registration values in the registration table 51 (or a case that the memory modules include the non-supported product), the diagnostic processing illustrated in FIG. 7 is executed. In this case, the diagnostic processing is automatically executed depending on the settings, so that an error message is displayed, and the personal computer is stopped.

When the two serial numbers match, the inspection processing unit 612 checks whether or not the verification processing has been executed as far as the final memory module (DIMM # N) (step S25). To achieve this, the inspection processing unit 612, for example, uses a variable "i", sets an initial value thereof as 0, takes a DIMM having the value of the variable i as a processing object, and increments the variable by +1 after setting of the memory module at the step S22. The value of N is assigned in advance (for example, N is taken as the number of DIMMs in a case that the main memory 2 is expanded to the maximum). When the verification processing has not been executed up to the final memory module, the inspection processing unit 612 repeats the processing of the step S21 and the subsequent steps. Thus, the inspection is performed as to whether the serial number of all of the memory modules DIMM 0 to N which are mounted matches the registration values in the registration table 51. When each of the serial numbers matches the registration value, the memory inspection ends normally, and the hard disk inspection is then performed.

When the memory inspection ends normally, the inspection processing unit 612 executes a hard disk inspection. More specifically, the inspection processing unit 612 sets a single hard disk as the object of the verification processing (step S26), reads out the serial number 91 from the header 92 of the hard disk 9 in the same manner as described above (step S27), compares the serial number 91 which is read out with the serial number of the hard disk 9 which is registered in the registration table 51, as described above, and checks whether or not the two serial numbers match (step S28).

When the two serial numbers do not match, as described above, the inspection processing unit 612 calls the diagnostic processing unit 613, and requests the diagnostic processing unit 613 to execute the memory diagnostic processing. As a result, with respect to all hard disks HDD 0 to N which are mounted, when any of the serial numbers does not match with the registration values in the registration table 51 (or a case that the hard disks include the non-supported product), the diagnostic processing illustrated in FIG. 7 is executed. In this case also, the diagnostic processing is automatically executed depending on the settings, so that an error message is displayed, and the personal computer is stopped.

When the two serial numbers match, similarly to above, the inspection processing unit 612 checks whether or not the verification processing has been executed as far as the final hard disk (HDD # N) (step S29). When the verification processing has not been executed up to the final hard disk, the inspection processing unit 612 repeats the processing of the step S26 and the subsequent steps. As a result, when the serial number of each of the hard disks 0 to N which are mounted matches the registration values in the registration table 51, the hard disk inspection ends normally. When the hard disk inspection ends normally, the inspection processing unit 612 activates the operating system (OS) (step S210).

In FIG. 7, the diagnostic processing unit 613 which is called from the inspection processing unit 612 checks whether or not the diagnosis for the non-supported memories is completed (step S31). When the diagnosis is completed, the diagnostic processing unit 613 activates the OS (step S32).

When the diagnosis is not completed, the diagnostic processing unit 613 displays an error message on the display 31 (step S33). Thereafter, based on whether the item "stop/start-up when the non-supported product is mounted" illustrated in FIG. 5 is set to either "use" or "do not use", the diagnostic processing unit 613 checks whether or not to use the function (step S34). The step S34 enables the user to set (select) whether or not to use the non-supported product.

An example of an error message screen (error screen) at the step S33 is illustrated in FIG. 8 to FIG. 10.

FIG. 8 is a view illustrating an error screen when an administrating person's password is set. When an administrating person's password is set for the personal computer, for example, the setting of the "stop/start-up when the non-supported product is mounted" function illustrated in FIG. 5 is automatically set to "use". Accordingly, in this case, as illustrated in FIG. 8, the start-up of the personal computer is stopped. This feature is suitable to operation at a business enterprise or the like, since an administrating person can supervise addition and the like of the memory modules.

FIG. 9 is a view illustrating an error screen when an administrating person's password is not set. This is an error screen in a case that the setting of the "stop/start-up when the non-supported product is mounted" function illustrated in FIG. 5 is set to "use" in a case that the administrating person's password is not set. For example, there are cases in which an ordinary user uses the main memory 2 or hard disk 9 which is the non-supported product (for example, the generic product). Therefore, taking into account such a situation, as illustrated in FIG. 9, a message is displayed to inform the user that starting of the personal computer will be stopped, and also induce the user to register the supported product (main memory 2 or hard disk 9).

FIG. 10 is a view illustrating an error screen in a case that setting of the "stop/start-up when the non-supported product is mounted" function illustrated in FIG. 5 is set to "do not use". In this case, even when the non-supported product is mounted, the personal computer is not stopped at start-up. In this case, as illustrated in FIG. 10, although a warning message is displayed the personal computer can be started, as described below.

In addition, in order to create the error screens illustrated in FIG. 8 to FIG. 10, the diagnostic processing unit 613 checks whether the setting is "use" or "do not use" at the step S33. Accordingly, it may be assumed that the steps S33, S34, and S36 are executed in an integrated manner.

When using the above function the diagnostic processing unit 613 stops start-up of the system (step S35). When not using the above function, the diagnostic processing unit 613 checks whether or not to use an automatic diagnosis function when the non-supported product is mounted (step S36), based on whether the item "automatic diagnosis when the non-supported memory product is mounted" illustrated in FIG. 5 is set to "use" or "do not use". More specifically, when the aforementioned item is set to "do not use", the diagnostic processing unit 613 determines that the above function is not to be used, and executes the step S35. In contrast, when the aforementioned item is set to "use", the diagnostic processing unit 613 displays the screen (excluding "diagnosing memory module . . . ") illustrated in FIG. 11. When the user inputs (selects) "No" on the above screen, the diagnostic processing unit 613 determines that the function is not to be used. In contrast, when the user inputs "Yes", the diagnostic processing unit 613 determines that the function is to be used. Thus, the step S36 allows the user to set whether or not to perform the automatic diagnostic processing when the non-supported product is mounted, using the screens illustrated in FIG. 5 and FIG. 11.

In the step S36, when the automatic diagnosis function is not used, the diagnostic processing unit 613 executes the step S35. When using the above function, the diagnostic processing unit 613 executes the automatic diagnosis of the memory (storage device, the same applies hereunder) (step S37). At this time, the diagnostic processing unit 613 further displays "diagnosing memory module . . . " on the screen illustrated in FIG. 11, and displays "finished" when the diagnosis is finished.

Thereafter, the diagnostic processing unit 613 checks whether or not there is any problem in a result of the automatic diagnosis (step S38). When there is a problem, the diagnostic processing unit 613 checks whether or not to use the memory (step S39). More specifically, the diagnostic processing unit 613 displays the screen illustrated in FIG. 12 to display a message that there is a problem, and then displays the message "Do you really want to use this memory?" When the user inputs "No" on the above screen, the diagnostic processing unit 613 determines not to use the memory, and executes the step S35. When the user inputs "Yes", the diagnostic processing unit 613 determines that the memory is to be used. By the step S39, the user can confirm whether or not to use the memory when the non-supported product is mounted.

In addition, when the user inputs "Yes", thereafter the diagnostic processing unit 613 may not display an error message regarding the non-supported products that is illustrated in FIG. 8 and the subsequent drawings. And, the diagnostic processing unit 613 may omit the diagnostic processing thereafter, and then may activate the OS. More specifically, the processing of the step S314 and the subsequent steps may be executed.

In the step S39, when using the memory, the diagnostic processing unit 613 checks whether or not the operating frequency of the memory is set to the lowest value (step S310). When the operating frequency is set to the lowest value, the diagnostic processing unit 613 executes the step S35. As the lowest value, the lowest value in a frequency range is used which is set in the registration table 51.

When the operating frequency of the memory is not set to the lowest value, the diagnostic processing unit 613 sets the operating frequency of the memory to the lowest value, displays the screen illustrated in FIG. 13 (excluding "diagnosing memory module . . . ") (step S311), executes the automatic diagnosis of the memory, displays "diagnosing memory module . . . " (step S312), and checks whether or not there is a problem in a result of the automatic diagnosis (step S313). When there is a problem, the diagnostic processing unit 613 executes the step S35.

When there is no problem in the result of the automatic diagnosis in the step S38, and when there is no problem in the step S313, the diagnostic processing unit 613 sets a diagnosis completed flag in a diagnosis result column of the registration table 51, displays the screen illustrated in FIG. 14 (step S314), reactivates the inspection processing unit 612 (step S315), and returns to a state when the power is turned on (or state when the step S11 illustrated in FIG. 3 is executed) (step S316). Since the non-supported products operating at the lowest frequency can thereby be used, it is possible to mount, to a certain extent, a large number of the non-supported products and use the non-supported products.

As described above, according to the present embodiment, with respect to an information processing apparatus, by registering in advance the identification information of storage devices which are supported by the information processing apparatus, it is possible to place the information processing apparatus in an unusable state when the storage device which is not supported by the information processing apparatus is connected to the information processing apparatus. It is therefore possible to prevent a situation in which the entire memory capacity of the storage device cannot be recognized, or a situation in which operation of the information processing apparatus becomes unstable.

Further, after making it possible to use only storage devices which are supported by the information processing apparatus, it is possible to enable use of the storage device which is not supported by the information processing apparatus on the responsibility of the user of the information processing apparatus. Furthermore, in this case, a diagnosis can be performed with respect to the storage device which is not supported by the information processing apparatus, and use of the information processing apparatus can be enabled when the diagnosis result is normal.

Therefore, since it is possible to contribute to stable operation of the information processing apparatus and also prevent the user from arbitrarily adding the storage device, the administrating person can easily manage the information processing apparatus. Further, in a case that the storage device which is not supported by the information processing apparatus is connected, the user can select whether or not to stop/start-up of the information processing apparatus, and thus the non-supported product (so-called the "generic product") can be used.

What is claimed is:

1. An information processing apparatus comprising:
   a storage device including identification information that is predetermined;
   a nonvolatile storage device registering the storage device together with the identification information;
   an inspecting unit reading the identification information from the storage device, and placing, when the identification information which is read is not registered in the nonvolatile storage device, the information processing apparatus in an unusable state; and
   a diagnostic unit performing a diagnosis of the storage device when the diagnostic unit is activated by the inspecting unit,
   wherein the inspecting unit activates the diagnostic unit when the identification information read from the storage device is not registered in the nonvolatile storage device.

2. The information processing apparatus according to claim 1, wherein the inspecting unit and the diagnostic units are provided in a self-diagnostic processing unit which performs a self-diagnosis of the information processing apparatus, and the self-diagnostic processing unit is provided in a BIOS (Basic Input Output System) which is activated when a power of the information processing apparatus is turned on.

3. The information processing apparatus according to claim 1, wherein the storage device comprises a plurality of memory modules or a plurality of hard disks.

4. The information processing apparatus according to claim 1, further comprising:
   a registering unit registering the storage device and the identification information in the nonvolatile storage device.

5. The information processing apparatus according to claim 1, wherein, when the identification information which is read out is not registered in the nonvolatile storage device, the inspecting unit outputs an error message and accepts instruction input indicating whether or not to place the information processing apparatus in an unusable state.

6. The information processing apparatus according to claim 1, wherein the inspecting unit outputs a result of diagnosis by the diagnostic unit and accepts instruction input indicating whether or not to use a storage device of which the identification information which is read out is not registered in the nonvolatile storage device.

7. The information processing apparatus according to claim 1, wherein, when the identification information which is read out is not registered in the nonvolatile storage device, the diagnostic unit performs the diagnosis of the storage device in a state that an operating frequency of the storage device is set to a lowest operating frequency.

* * * * *